(12) United States Patent
Prampolini

(10) Patent No.: US 8,604,402 B2
(45) Date of Patent: Dec. 10, 2013

(54) SPACECRAFT AFTERBODY DEVICE

(75) Inventor: Marco Prampolini, Chambourcy (FR)

(73) Assignee: Astrium SAS, Paris (FR)

( * ) Notice: Subject to any disclaimer, the term of this patent is extended or adjusted under 35 U.S.C. 154(b) by 633 days.

(21) Appl. No.: 12/745,177

(22) PCT Filed: Nov. 21, 2008

(86) PCT No.: PCT/EP2008/066029
§ 371 (c)(1),
(2), (4) Date: Sep. 2, 2010

(87) PCT Pub. No.: WO2009/068488
PCT Pub. Date: Jun. 4, 2009

(65) Prior Publication Data
US 2010/0327108 A1 Dec. 30, 2010

(30) Foreign Application Priority Data
Nov. 29, 2007 (FR) ...................... 07 59434

(51) Int. Cl.
*F42B 10/00* (2006.01)
(52) U.S. Cl.
USPC ........................... 244/3.3; 244/130; 102/490
(58) Field of Classification Search
USPC ................ 244/3.3, 130, 3.1, 3.26, 3.24, 3.27; 102/490
See application file for complete search history.

(56) References Cited

U.S. PATENT DOCUMENTS

| | | | |
|---|---|---|---|
| 2,926,491 A * | 3/1960 | Hyde | 239/265.41 |
| 3,432,125 A | 3/1969 | Schroeder, Jr. | |
| 4,411,399 A * | 10/1983 | Hapke | 244/130 |
| 5,120,005 A * | 6/1992 | Reedy | 244/113 |
| 5,871,173 A | 2/1999 | Frank et al. | |
| 6,297,486 B1 * | 10/2001 | Rom et al. | 244/3.3 |
| 6,723,972 B2 * | 4/2004 | Schroeder et al. | 244/3.3 |
| 6,745,979 B1 | 6/2004 | Chen | |
| 6,926,345 B2 | 8/2005 | Ortega et al. | |
| 7,997,205 B2 * | 8/2011 | Greenwood et al. | 102/490 |
| 8,312,813 B2 * | 11/2012 | McDermott et al. | 102/490 |
| 2006/0150612 A1 | 7/2006 | Anderson et al. | |

FOREIGN PATENT DOCUMENTS

| | | |
|---|---|---|
| DE | 1 288 447 | 1/1969 |
| DE | 41 01 960 | 7/1992 |
| EP | 0 273 850 | 7/1988 |
| FR | 2 705 739 | 12/1994 |
| GB | 1 243 641 | 8/1971 |

OTHER PUBLICATIONS

International Search Report and Written Opinion for Application No. PCT/EP2008/066029, dated Dec. 16, 2008.

* cited by examiner

*Primary Examiner* — Christopher P Ellis
(74) *Attorney, Agent, or Firm* — Perman & Green, LLP

(57) ABSTRACT

An afterbody device for a spacecraft fitted with at least one rocket engine at the rear of the craft includes at least one movable cover element designed to take a first position, masking and reducing the vehicle's rear drag, where it prolongs the vehicle's fuselage around at least one part of a rocket engine nozzle of the vehicle and extends beyond the rear of the vehicle's fuselage, and to take a second position fully deployed, increasing the vehicle's aerodynamic drag.

14 Claims, 3 Drawing Sheets

SPACECRAFT AFTERBODY DEVICE

RELATED APPLICATIONS

This application is a U.S. national phase entry of PCT International Application No. PCT/EP2008/066029 filed Nov. 21, 2008, which claims the priority of French Application No. FR 07 59434, filed Nov. 29, 2007, the contents of which are incorporated by reference herein for all purposes.

FIELD OF THE INVENTION

This invention relates to a spacecraft afterbody device particularly designed to reduce the craft's aerodynamic drag during the atmospheric flight phase.

In particular it finds its application in space vehicles that comprise a traditional aerial engine for the atmospheric flight and rocket propulsion for the flight outside the atmosphere.

BACKGROUND

A vehicle's resistance to movement due to its rear section is known as base drag.

The fluid flows that have difficulty following the rear profiles of moving vehicles become turbulent behind the vehicle, which reduces pressure at the rear of the vehicle and creates a strong resistance to the vehicle's forward movement.

Passive solutions exist that reduce the rear drag of vehicles and in particular solutions are known wherein a vehicle's rear profile is realized as a cone by using an inflatable bladder as described for example in document DE 41 01 960, adding flow deflection profiles as described for example in document EP 0 273 850, one or more annular appendages as in document U.S. Pat. No. 6,297,486, lateral deflectors as in document U.S. Pat. No. 6,926,345.

Other realizations are based on active means such as mobile flaps as described in document U.S. Pat. No. 4,411,399 or an injection of fluid in the rear of the vehicle in order to fill the depression.

Aerial vehicles propelled by jet engines present a jet pipe propelling nozzle and the jet engines only create a small amount of drag because the jet of ejected gases plays a role in the vehicle's aerodynamic profile.

In contrast an unused engine creates an enormous amount of drag (up to one third of the vehicle's total drag).

That is why, for example, when the American space shuttle currently in service is transported by airplane, it is equipped with a conical rear cover masking the nozzles of its rocket engines.

On the other hand, such a cover cannot be used when this shuttle is launched because it would be necessary to jettison it before igniting the rocket engine, which would entail designing a cumbersome release device ensuring that no debris could damage the shuttle or the jettisonable boosters.

The same would apply to a space plane, for which the jettisoning operation would remain risky.

Similarly, using active fluid-injection devices on a space plane would require the fluid to be carried in the vehicle, which would reduce its payload.

Further, in the field of propulsion, it is known to fit turbine engines with active flow deflection devices to direct the flow of the propelling gases. Document US 2006/0150612 A1 is an example of such devices.

However, this technique is not used in rocket engines, for which directing the nozzle to adjust the vehicle's trajectory is preferred.

Similarly airbrake devices are known comprising flaps integrated in the aircraft jet engine's exhaust and being deployed to slow the aircraft down. Document U.S. Pat. No. 5,120,005 relates to such devices combining flaps opening behind the engine and flaps converging into the jet engine's exhaust flow to break the engine's thrust.

For its part, document FR 2 705 739 describes a device for adjusting the diameter of the exhaust section of a rocket engine divergent nozzle to adapt the divergent nozzle to variable ambient conditions of flight.

This device only changes the annular diameter of the exhaust and the shape of the walls facing the divergent nozzle along an axial symmetry in relation to the axis of the divergent nozzle.

As regards the stabilization of a towed vehicle by increasing its drag, it is known from document U.S. Pat. No. 5,871,173 to arrange blades that are deployed at the rear of the vehicle like umbrella stays.

The specific case of a spacecraft designed for atmospheric flight using jet engines and designed for flight outside the atmosphere using a rocket engine leads to contradictory requirements with respect to performance.

In aeronautical-type atmospheric flight, minimal drag is required and therefore in particular as small a cross-section as possible for the rear section, whereas for space flight, a large cross-section for the engine nozzle exhaust is desired, which is detrimental to the reduction of base drag.

The presence of rocket propulsion therefore presents a problem in atmospheric flight because it generates a lot of drag due to the cross-section of the nozzle which is wide and forms a straight cut at the rear of the vehicle.

SUMMARY OF THE INVENTION

The aim of the present invention is to produce an active and movable drag reduction device for spacecraft, installed to perform a function additional to the simple function of covering the rear of the vehicle in flight phases, such as atmospheric ascent, when the rocket engine is not in use.

According to the invention, the device is installed in this way to take part in controlling the vehicle so as to add value to the device and to compensate for its weight by using it in braking and controlling the vehicle, in particular in the phases of return to atmospheric flight.

The device of the invention has the advantage in this case of allowing a simplification and a weight reduction in the flight controls of a space plane since these flight controls no longer need to be designed to carry out the plane's aerodynamic braking.

To achieve this, this invention provides an afterbody device for a spacecraft fitted with at least one rocket engine at the rear of the craft characterized in that it comprises at least one movable cover element designed to take a first position, masking and reducing the vehicle's rear drag, where it prolongs the vehicle's fuselage around at least one part of a rocket engine nozzle of the vehicle and extends beyond the rear of the vehicle's fuselage, and to take a second position fully deployed, increasing the vehicle's aerodynamic drag.

The present invention thus realizes an active spacecraft drag reduction device, whose weight increase is compensated for by making it perform control assistance functions for most of the phases of flight outside the atmosphere and of return and, in particular, aerodynamic functions when the rocket engine is off, propulsive functions when the rocket engine is operating.

BRIEF DESCRIPTION OF THE DRAWINGS

Other features and advantages of the invention will become apparent in reading the following description of a non-limiting example of realization of the invention with reference to the drawings, which show.

DETAILED DESCRIPTION

The invention applies in particular to a spacecraft whose rocket engine is not used during atmospheric flight phases and creates significant aerodynamic drag, braking the vehicle and requiring an increase in the thrust necessary during take-off to the ascent of the vehicle in the atmosphere.

The invention applies in particular to a vehicle such as a space shuttle in which the take-off and the atmospheric flight phase, or most of this phase, are performed with propulsion means other that the vehicle's rocket engine.

It applies for instance to a spacecraft that will be taken to a launch altitude by a carrier airplane, to a spacecraft propelled by jettisonable boosters for its take-off and atmospheric ascent, to a spacecraft such as a space-plane type of suborbital vehicle in which the first part of the trajectory is performed with an aeronautical type of propulsion using engines operating with oxygen from the air and foils, before switching to a rocket type of propulsion.

Figure 1:
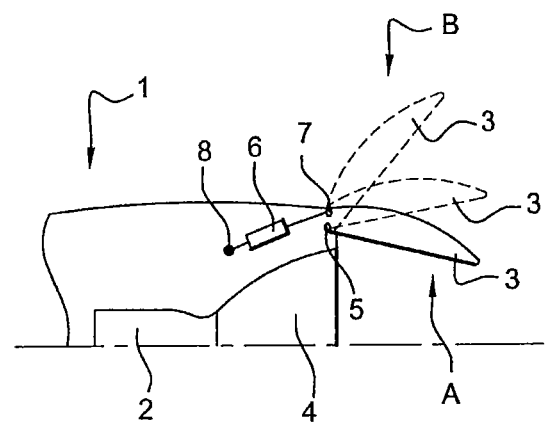
in FIG. 1: a schematic side view in cross-section of the rear of a spacecraft fitted with the device of the invention, in FIG. 2: a perspective view of a movable cover element of the device of the invention, in FIG. 3: a rear view of a spacecraft fitted with the device of the invention, in FIGS. 4A to 4E: schematic side views of an aircraft fitted with the device of the invention according to several flight configurations, and in FIG. 5: a cut-away side view of the space plane in FIG. 3.

The example shown in the figures corresponds to this last type of vehicle fitted with its own atmospheric engines 9, represented in FIGS. 4A to 4E and fitted with at least one rocket engine 2 fitted with a nozzle 4 installed at the rear of the vehicle as shown in FIG. 1.

The first function of the spacecraft afterbody device is to mask nozzle 4 during the vehicle's atmospheric flight phases, when the rocket engine is not used.

Figure 2:
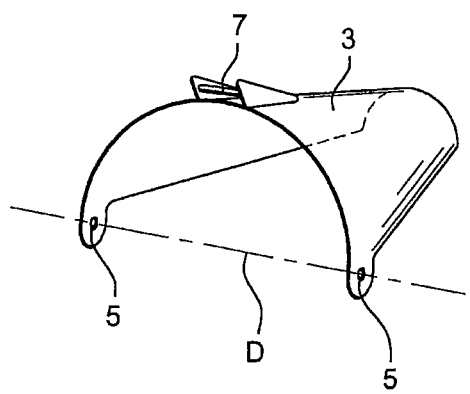

To achieve this, it comprises at least one cover element, an example of realization of which is shown in FIGS. 1 and 2 as a panel with a conical shape 3.

To mask nozzle 4 completely and confer an aerodynamic shape to the rear of the fuselage, the cover element preferably comprises several panels 3a, 3b, 3c, 3d arranged so as to prolong the fuselage and which extend beyond the rear of the vehicle's fuselage to form a shell around the nozzle in a position A masking the nozzle.

The cover element or elements can be moved separately and are designed to take first position A, masking and reducing the vehicle's rear drag, in which the cover is closed and prolongs the vehicle's fuselage around at least one part of the nozzle 4 of the vehicle's rocket engine and extends beyond the rear of the vehicle's fuselage, and to take a second position B fully deployed, increasing the vehicle's aerodynamic drag.

In this second position, the nozzle is uncovered to allow the rocket engine to operate and the propulsion jet to develop.

Figure 3:
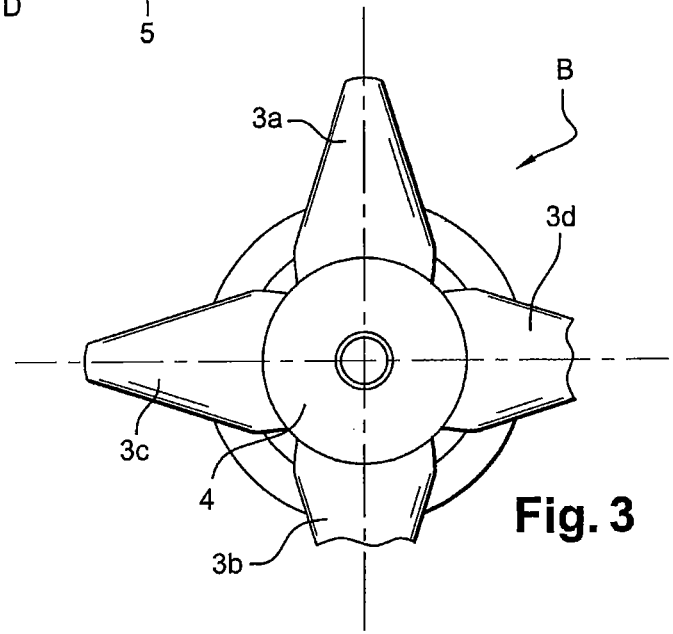

This position is shown in FIG. 3 in the context of an example of realization in which the device comprises four flaps 3a, 3b, 3c, 3d, two of which are deployed in a vertical plane and two are deployed in a horizontal plane.

As shown in FIG. 1, the cover elements 3 prolonging the vehicle's fuselage are hinged on the fuselage by rotating means of fastening 5.

Each element's hinge is installed such that it can rotate around an axis D as shown in FIG. 2.

To be able to open and close cover elements 3, 3a, 3b, 3c, 3d and make them movable with respect to the fuselage, they are linked to this latter via an actuator 6 fixed onto the cover element by a first rotating link 7 and onto the fuselage by a second rotating link 8.

Rotating link 7 is offset perpendicularly to the element's axis of rotation D so that the panels can be moved.

According to an advantageous property of the invention, at least one part of cover element 3, 3a, 3b, 3c, 3d is continuously movable, using actuator 6, between the masking and drag reduction position A and the fully deployed position B, to intermediate positions $C_1, C_2, C_3$ for correcting the vehicle trajectory.

In particular, according to the example shown in FIGS. 4A to 4E, the cover element comprises at least one generally upper panel 3a and a generally lower panel 3b designed to be moved separately and to achieve control of the vehicle during stalls and dives.

In the context of the example of FIG. 2, the cover element comprises at least two generally lateral panels 3c, 3d designed to achieve control of the vehicle during a spin.

In this last case the cover element comprises four panels 3a, 3b, 3c, 3d arranged as petals closing around nozzle 4 of the vehicle and allowing, through their deployment, the trajectory of the vehicle to be corrected, especially during its return into the atmosphere with rocket engine 2 not operating.

Detailed below, with references to FIGS. 4A to 4E, is the case of a spacecraft made up of a space plane 11 fitted with atmospheric engines 9 for the atmospheric flight phases of the plane and fitted with an afterbody device comprising a cover element made up of two flaps 3a, 3b moving separately in a vertical plane to mask or uncover the rocket engine's nozzle.

Such a configuration allows the implementation of a method for correcting the trajectory of a space plane 11 according to which the plane's trajectory is corrected by moving at least one cover element 3a, 3b of the device to intermediate positions $C_1, C_2, C_3$ between a position masking the plane's rocket engine nozzle A and a fully deployed position B for aerodynamically braking the plane.

Figure 4A:
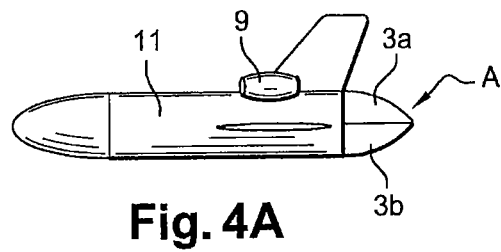
Figure 4B:
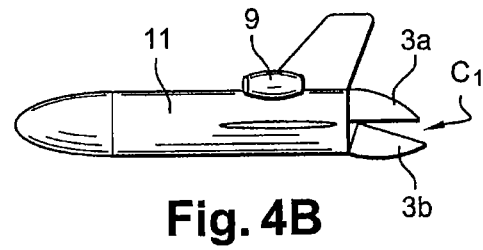
Figure 4C:
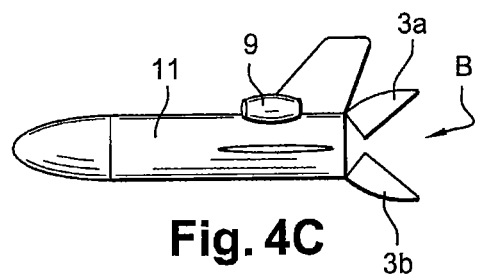
Figure 4D:
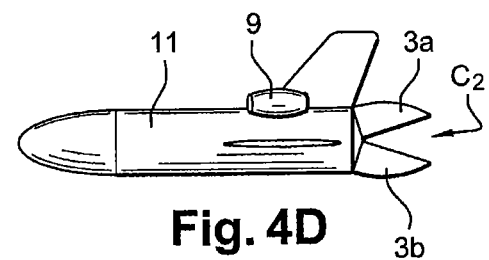
Figure 4E:
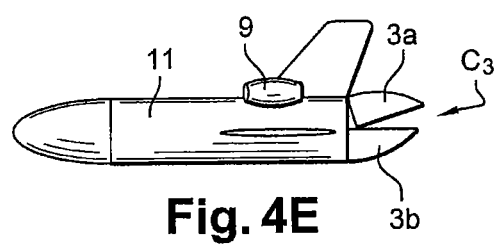
Figure 5:
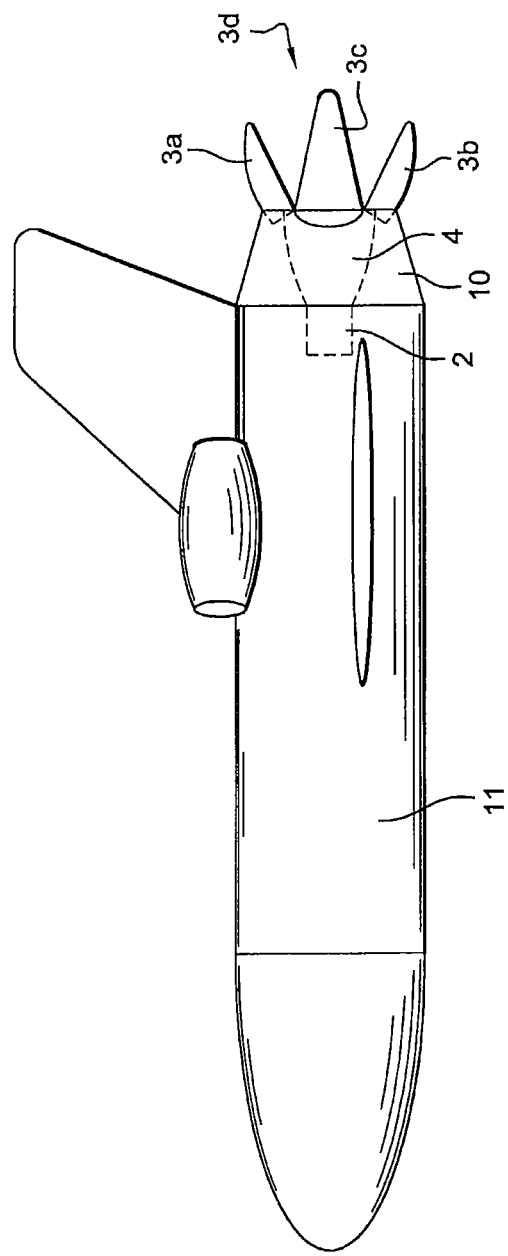

It should be noted that the examples in FIGS. 4A to 4E are described in the case of a cover in two parts, one upper and one lower, can be transposed to the case in which the device comprise four panels as shown in FIG. 5, two panels 3a, 3b being moved separately in a vertical plane and two panels 3c, 3d being moved separately in a horizontal plane, these latter operating according to the principle of the invention adding a spin control.

FIG. 4A corresponds to masking position A, which permits a decrease in base drag and a decrease in aerodynamic loads on the nozzle. In the case of a space plane it is used during aeronautical ascent, during which ascent the plane is under atmospheric control.

For a jettisonable propulsion stage or booster fitted with the device of the invention, this position can be used during the recovery of the stage or booster or, in the case of a reusable launcher for the cruising phase of the return to the launch base.

In this position the two or four petals made up by panels 3a, 3b are of course closed so as to minimize drag and protect the rocket engine.

FIG. 4B corresponds to a contribution of panels 3a, 3b to high incidence flight.

One is in a high incidence position at high altitude during a reentry, to increase drag and therefore increase the vehicle's deceleration in a still very rarefied atmosphere, whether this be for a space plane or for recovering a jettisonable propulsion stage or a reusable launcher.

The high incidence position creates the aircraft's braking and the lower flap is used, in this configuration, to balance the position and stabilize the vehicle in the high incidence position by moving the center of thrust rearwards by air braking.

The high incidence position is balanced by the opening or closing of the lower petal in intermediate positions between the masking position and the fully deployed position.

FIG. 4C corresponds to air braking and stabilization positions around a zero incidence and/or zero slip attitude.

In this position, all the petals are opened to a greater or lesser extent, according to the speed conditions and braking requirements. The opening is then regulated and controlled close to the fully deployed position.

This operating mode is used in particular during the final approach for a space plane or a reusable launcher. This is then a matter of controlling the gliding speed.

More or less strong aerodynamic braking is achieved by opening the petals more or less between the position in FIG. 4A and that in FIG. 4C.

It can also be used during the transonic passage upon reentry of a vehicle with zero lift gradient such as a jettisonable propulsion stage or a reusable launcher, or in the case of a straight-wing space plane.

It can also be used while securing in the case of incidents during the powered phase of a space plane.

FIG. 4D corresponds to an intermediate position for increasing thrust in rocket mode.

In this operating mode, cover element 3, 3a, 3b, 3c, 3d can be moved between masking and drag reduction position A and fully deployed position B, to intermediate positions for controlling the rocket engine.

In addition, this position provides the vehicle with protection against the effects of jet breakup.

To achieve this, the cover element comprises panels designed to form a screen that opposes the rocket engine's jet breakup and to refocus the jet to increase the engine's thrust.

In this position, the petals are opened during flight outside the atmosphere to assist the jet breakup and increase the thrust recovery.

This is of course accompanied by a decrease in thermal flows towards the rear of the vehicle.

This position increases the thrust of the rocket engine by increasing the diameter of the nozzle's exhaust via an appropriate opening of the petals. In this operating mode, the cover element can be moved in particular between masking and drag reduction position A and fully deployed position B, to positions for thermally protecting the rear of the vehicle.

The petals then form a screen that protects the rear part of the vehicle from high altitude rocket engine jet breakup, at least the internal wall of the cover having high thermal resistance, either because the cover elements are made of a high thermal resistance material or because a coating resistant to the heat of the jet covers the internal surface facing the jet of the cover elements.

This allows in particular the weight of the thermal protections required at the rear of the vehicle to be decreased and the petals of the device thus operate as an aerodynamic appendage in the closed position and as a fire wall in the open position.

This operating mode is applicable to a space plane, jettisonable boosters and reusable launchers during the rocket-propelled ascent in the upper atmosphere or in a vacuum.

This operation corresponds to a method of optimizing the space plane's rocket engine according to which at least one cover element of the device is moved to positions assisting the rocket engine jet breakup, between a position masking a nozzle of a rocket engine of the plane A and a fully deployed position for aerodynamically braking the plane B.

FIG. 4E corresponds to a position of vectorization of the rocket engine's thrust.

This is a mode of operation perfected from the previous one, in which the asymmetrical opening of the petals allows vectorial control of the thrust and therefore control of the aircraft.

This mode of operation therefore, of course, applies to a space plane, a jettisonable booster or a reusable launcher during the rocket-propelled ascent in the upper atmosphere or in a vacuum.

In summary, the device of the invention allows the petals to be used to perform external aerodynamic functions when the rocket engine is not operating and propulsive functions when the rocket engine is operating.

It will be noted that, for the flight domain in which the rocket engine is not operating, the device interacts with the vehicle's external aerodynamic flow whereas for the flight domain in which the rocket engine is operating, interaction with the rocket engine jet flow is desirable.

This implies that the non-operating engine flight domain concerns the external face of the petals whereas in the operating engine flight domain it is the internal surface of the petals that is used.

More precisely, these two flight domains cover a number of system functions, i.e. for the first domain reducing drag as shown in FIG. 4A, contributing to the longitudinal high incidence balance as shown in FIG. 4B, stabilization close to zero incidence and slip as shown in FIG. 4C during the transonic phase and aerodynamic braking during the approach with an intermediate position of the petals between the positions in FIGS. 4A and 4C.

For the second domain, the functions covered by the device of the invention are increasing thrust by assisting the jet breakup at high altitude and/or thrust vectorization as shown in FIG. 4E, protecting certain afterbody parts from rocket engine jet breakup, examples in FIGS. 4D and 4E.

Of course, to realize the operating modes of this invention, the aircraft is fitted with complementary sub-assemblies comprising a set of actuators 6 fitted in an appropriate way between the fuselage and the petal panels. These actuators, which may be hydraulic or electric, are supplied in a known way with power and controlled by control devices.

The complementary sub-assemblies further comprise an electronics assembly, not shown, for controlling the position of the petals, an electronics assembly that must be interfaced firstly to the aircraft flight program and secondly to an appropriate set of sensors able to define in real time the position of the aircraft in space and that of the panels.

According to a preferred embodiment, the complete cover or fairing is composed of 4 petals according to the example in FIG. 3. These petals are formed by panels 3a to 3d made of materials able to support the rocket engine's thermal flows, such as an inconel, or composite ceramics e.g. carbon/carbon protected against oxidation or carbon/SiC also protected.

The petals formed by panels 3a, 3b moving along a vertical plane operate according to the positions described hereabove. The petals formed by panels 3c, 3d move along a horizontal plane and allow the aircraft's spin trajectory to be corrected, take part in braking in the fully deployed position or vectorize the rocket engine thrust in a horizontal plane.

As shown in FIG. 1, each petal comprises an articulated fastener 5 allowing a link with the rear of the space plane's fuselage.

As shown in FIG. 5, rocket engine 2 is inserted into the fuselage practically up to the exhaust section of nozzle 4 so also as to reduce aerodynamic drag, the rocket engine itself being a geometrically complex assembly likely to generate drag.

Advantageously, the fuselage is prolonged by a tapered annular covering 10 to which the panels or petals 3a to 3d are connected.

Back in FIG. 1, each petal also comprises a fastening point for an actuator 6 repeated on the space plane's fuselage such that the movement of actuator 6 allows a wider or narrower opening of the petal, as required.

The shape of the panels forming the petals contributes in itself to the rigidity of these petals and to their resistance to the forces they are subject to.

The invention therefore makes it possible to eliminate the rocket engine control devices and in particular the actuators and their power source, to reduce the thermal protection of the bottom of the vehicle, To reduce the gas needed for the attitude control system and in particular the small rocket thrusters that are used to stabilize a vehicle in a vacuum and to reduce the size and weight of the plane's control flap systems.

The figures represent simple specific functions. It is, of course, possible within the framework of the invention to combine the functions and, for instance, it is possible in a configuration with four petals to perform braking while turning laterally or adjusting the incidence.

This is the advantage of having several petals that can be controlled independently.

The invention is not limited to the example represented and in particular the cover element can have an oval cross-section if the spacecraft comprised two engines or more.

The invention claimed is:

1. An afterbody device for a spacecraft vehicle having a fuselage and fitted with at least one rocket engine at a rear of the vehicle, the afterbody device comprising movable cover elements, wherein said movable cover elements:
    are capable of taking a first position masking the rear of the vehicle and reducing a rear drag of the vehicle, where the cover elements prolong the vehicle's fuselage,
    extend beyond the rear of the vehicle's fuselage and cover a rocket engine nozzle of the vehicle, and
    are capable of taking a second position fully deployed, increasing an aerodynamic drag of the vehicle.

2. The spacecraft afterbody device of claim 1, wherein the cover elements prolonging the vehicle's fuselage are hinged on said fuselage.

3. The spacecraft afterbody device of claim 2, wherein at least one of the cover elements can be moved with respect to the fuselage via an actuator.

4. The spacecraft afterbody device according to claim 1, wherein at least one of the cover elements is continuously movable between the first position and the second position, to intermediate positions for correcting a trajectory of the vehicle.

5. The spacecraft afterbody device according to claim 1, wherein at least one of the cover elements is movable between the first position and the second position, to intermediate positions for controlling the rocket engine.

6. The spacecraft afterbody device according to claim 1, wherein at least one of the cover elements can be moved between the first position and the second position, to positions for thermally protecting the rear of the vehicle, wherein at least an internal wall of at least one of the cover elements has a high thermal resistance.

7. The spacecraft afterbody device according to claim 1, wherein the cover elements comprise panels arranged so as to prolong the fuselage and extending beyond the rear of the vehicle's fuselage and arranged to be separately movable.

8. The spacecraft afterbody device according to claim 7, wherein the cover elements comprise at least one generally upper panel and a generally lower panel capable of achieving control of the vehicle during stalls and dives.

9. The spacecraft afterbody device according to claim 7, wherein the cover elements comprise at least two generally lateral panels capable of achieving control of the vehicle during a spin.

10. The spacecraft afterbody device according to claim 1, wherein the cover elements comprise panels arranged as petals closing around the nozzle of the vehicle.

11. The spacecraft afterbody device according to claim 1, wherein the cover elements comprise panels designed to form a screen that opposes a jet breakup of the rocket engine and to refocus a jet of the rocket engine to increase a thrust of the engine.

12. A spacecraft comprising a spacecraft afterbody device according to claim 1, wherein the spacecraft is a space plane fitted with atmospheric engines for atmospheric flight phases of the plane.

13. A method for correcting a trajectory of a space plane having a device according to claim 1, the method comprising:
    moving at least one cover element of the device to intermediate positions between a position masking the a rocket engine nozzle of the plane and a fully deployed position; and
    aerodynamically braking the plane.

14. A method for optimizing a rocket engine of a space plane having a device according to claim 1 comprising:
    moving at least one cover element of the device to positions assisting a jet breakup of the rocket engine, between a position masking a nozzle of the rocket engine of the plane and a fully deployed position for aerodynamically braking the plane; and
    correcting a trajectory of the plane by moving the at least one cover element to intermediate positions between the position masking the plane's rocket engine nozzle and the fully deployed position for aerodynamically braking the plane.

* * * * *